United States Patent [19]

Basteck

[11] Patent Number: 5,391,023
[45] Date of Patent: Feb. 21, 1995

[54] MACHINE REAMER

[76] Inventor: Andreas Basteck, Oberer Schlossberg 6, 71686 Remseck, Germany

[21] Appl. No.: 170,583

[22] Filed: Dec. 20, 1993

[30] Foreign Application Priority Data

Dec. 22, 1992 [DE] Germany .................. 4243586

[51] Int. Cl.6 ............................. B23B 51/00
[52] U.S. Cl. ........................... 408/146; 408/153; 408/713
[58] Field of Search ............... 408/146, 153, 161, 162, 408/163, 179, 186, 190, 191, 713, 185; 407/38, 39, 44

[56] References Cited

U.S. PATENT DOCUMENTS

| 3,195,376 | 7/1965 | Boder | 408/146 |
| 3,591,305 | 7/1971 | Aichhorn | 408/161 |
| 3,785,746 | 1/1974 | Wolf et al. | 408/185 |
| 4,133,399 | 1/1979 | Herrmann | 408/713 |
| 4,353,669 | 10/1982 | Striegl | 408/185 |

Primary Examiner—Daniel W. Howell

[57] ABSTRACT

In a machine reamer a cutter is guided in a guide slot in the main body and is supported at one end against a pin-shaped axial adjuster. The axial adjuster is a hollow cylindrical stop pin whose slotted pin head can be radially expanded by means of a countersunk head screw, whereby the cutter supported against it is sensitively moved in the direction radial to the axis of the pin.

6 Claims, 3 Drawing Sheets

MACHINE REAMER

BACKGROUND OF THE INVENTION

Field of the Invention

The invention relates to a machine reamer having a guide slot, a cutter longitudinally guided in the guide slot, a clamp for clamping the cutter in the guide slot and a stop pin for positioning the cutter in the guide slot.

Relevant Prior Art

A machine reamer of this type is known, for example, from U.S. Pat. No. 4,353,669. The stop pin is in the form of a fixed longitudinal stop. However, there are applications for which it is necessary to adjust the cutter in the longitudinal direction of the slot. For this purpose, according to German laid open application DE-AS 1 239 911, an adjusting screw is provided that is screwed obliquely into the main body of the reamer and whose tip region serves as a variable stop. However, this arrangement has the disadvantage that the adjusting screw can be turned only when the cutter has been separated from the main body, so that fine adjustment is not possible.

SUMMARY OF THE INVENTION

The object of the invention is to provide a machine reamer of the type described that permits sensitive, accurate adjustment of the cutter in the longitudinal direction of the slot. The object is achieved by a wedge that expands the head of the stop pin radially in the end region of the cutter guide slot with fine adjustment to position the cutter in the guide slot.

The wedge mechanism acting on the pin head can be operated from the exposed end face of the pin head without difficulty. During operation, the cutter remains lightly clamped in the guide slot, so that its position can be directly verified with the aid of a measuring caliper.

In a preferred embodiment of the wedge mechanism according to the invention, a stop pin has an end face on its head. The stop pin has an inner wall with a first region having an internal peripheral conical surface leading out to the end face and a second region having an internal screw thread directed towards the foot of the stop pin. An axially parallel transverse slot splits the head. The wedge comprises a screw that has a threaded stem arranged to be screwed into the internal screw thread of the stop pin and a countersunk head arranged to be pressed against the internal peripheral conical surface. Two wedge mechanisms act in this arrangement. The first wedge mechanism is the screw thread anchorage of the screw. The second wedge mechanism is an actual expanding cone in the form of the head of the countersunk head screw. This serial arrangement of two wedge mechanisms results in particularly fine adjustment, whereby the cutter can be positioned with fine accuracy in the μm range.

The following dimensional ratios have been found to be successful in practice in respect to stability and size of the adjustment range. First, the transverse slot has an axial length that is approximately 50 to 65% of the total length of the stop pin. Second, the transverse slot on the stop pin has an inner end region with a widening transverse bore that has a maximum radial width that is approximately 40 to 70% of the outside diameter of the stop pin. Third, the stop pin has a cylindrical outer surface that has an outside diameter that is approximately 35 to 50% of the total length of the stop pin.

By means of the following configuration, excessive expansion of the pin head is prevented. The blind bore of the main body is a stepped bore with a narrow first region in which the foot of the pin is fixed and a wider second region in which the head of the pin is positioned. The second region has a width that prevents expansion of the head of the pin beyond its elastic limit.

DESCRIPTION OF THE DRAWINGS

The invention is explained more fully below with the aid of preferred embodiments taken together with the drawings, in which.

DETAILED DESCRIPTION OF PREFERRED EMBODIMENTS

Figure 1:
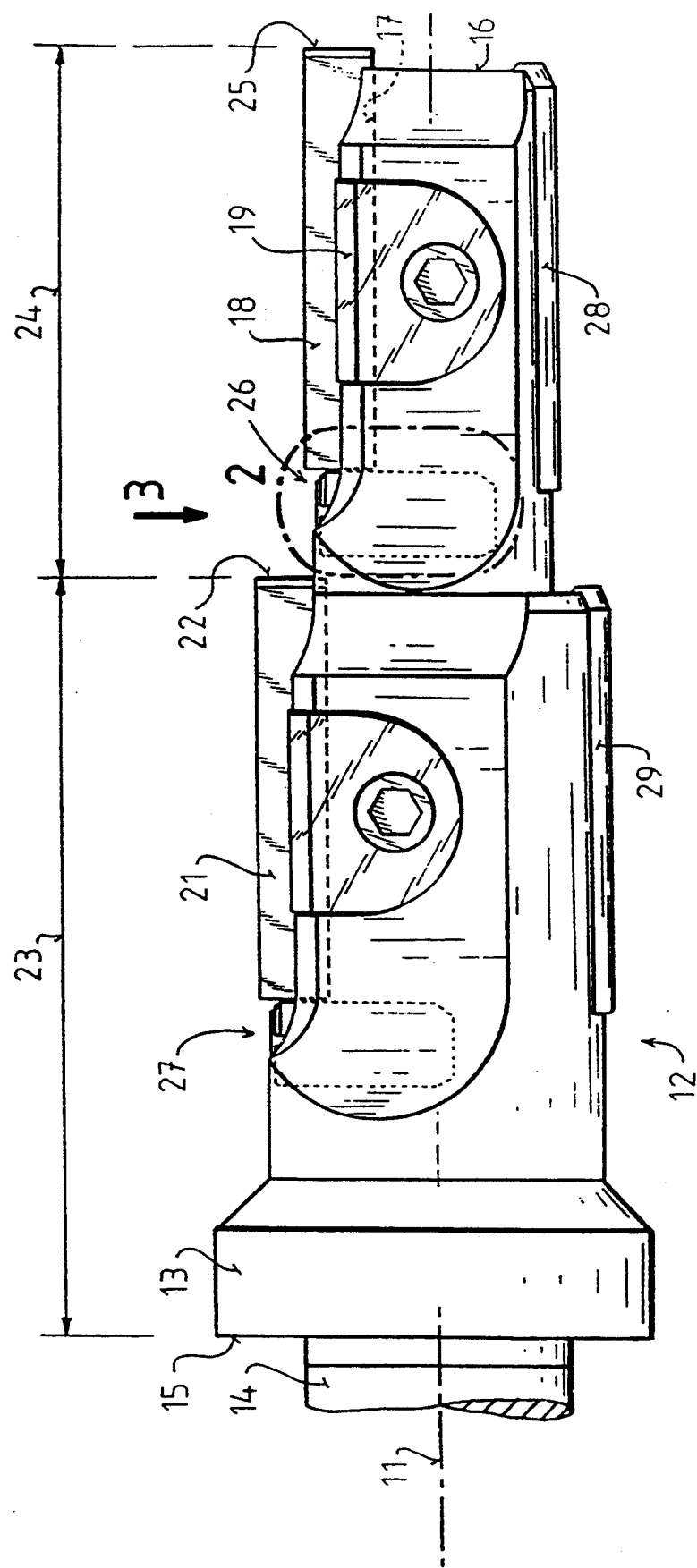
FIG. 1 is a side view of the front region of a stepped reamer according to the invention.

The reamer according to FIG. 1 has in a manner known per sea cylindrical main body 12 that is approximately coaxial to a geometrical longitudinal axis 11 and has, on the left, a stop collar 13 and a clamping shank 14. The stop collar 13 has on the shank side an annular end face 15 that serves to align the reamer in a defined axial position relative to a machine drill head.

In the main body 12, a guide slot 17 leads out onto the right-hand end face 16 and extends parallel to the longitudinal axis 11. In the guide slot 17, an elongated lamina-like cutter 18 is guided and is fastened by means of a clamping claw 19. This configuration is known per se and need not be further explained.

In the example, a second cutter 21 of the same kind is mounted in the same way in a central region of the main body 12. The two cutters 18 and 21 are intended to illustrate the importance of the axial adjustment. Thus, the right-hand cutting edge 22 of the cutter 21 is at a predetermined distance 23 from the annular end face 15 and at another predetermined distance 24 from the right-hand cutting edge 25 of the cutter 18. These distances must be accurately maintained, and this explains why an axial adjustment facility 26, 27 is necessary for both cutters 18 and 21.

However, even if only one cutter 21 is provided, it will be necessary to adjust the distance 23 if the reamer is clamped in a defined position in a numerically controlled machine tool by means of the stop collar 13. In the case of a machine reamer not provided with such a positioning device it may finally be necessary to adjust the cutting edges 22 or 25 in relation to the end faces of guide strips 28 or 29, particularly when the cutters are reground.

Figure 2:
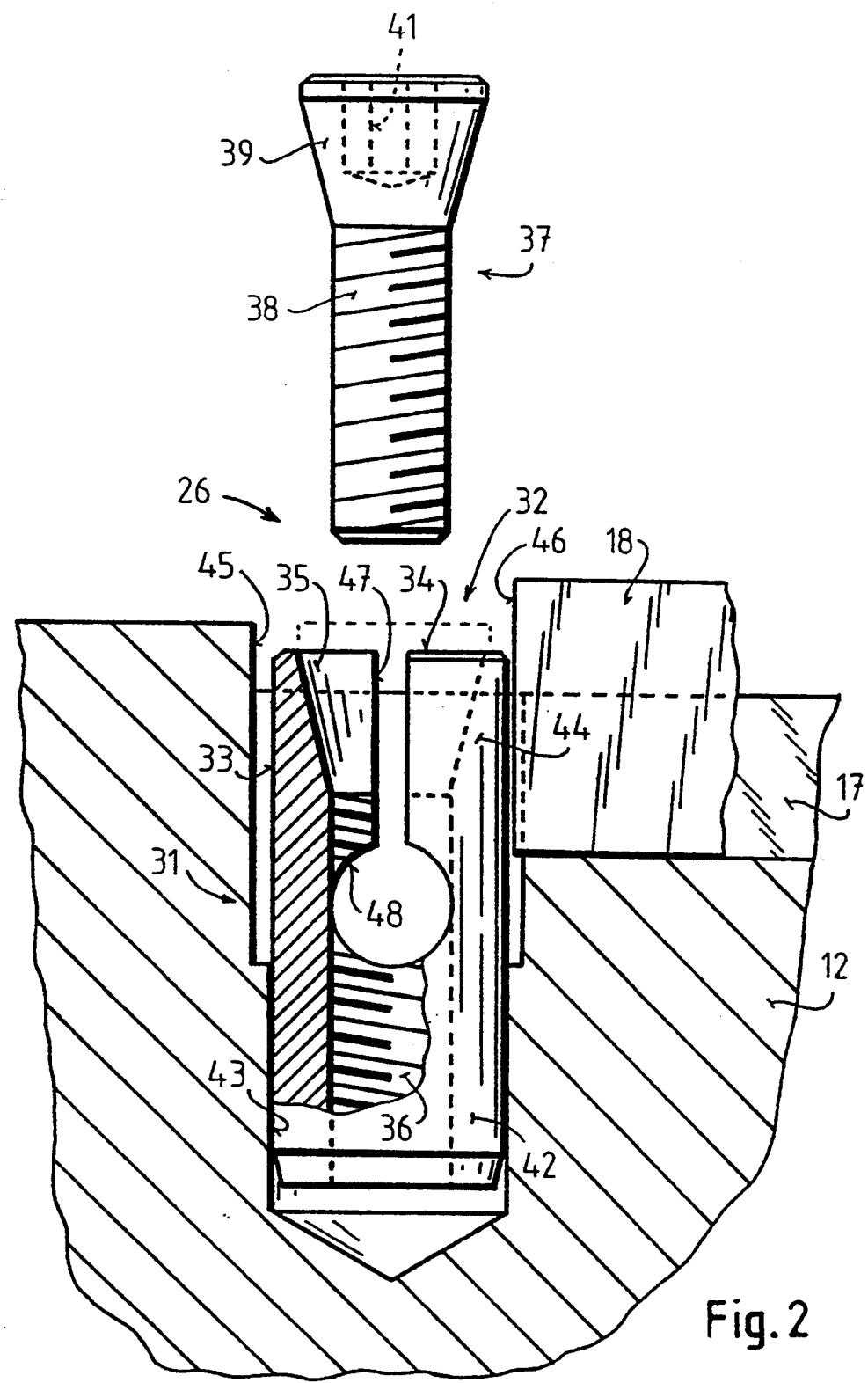
FIG. 2 is a sectional view on a larger scale of region 2 in FIG. 1.
Figure 3:
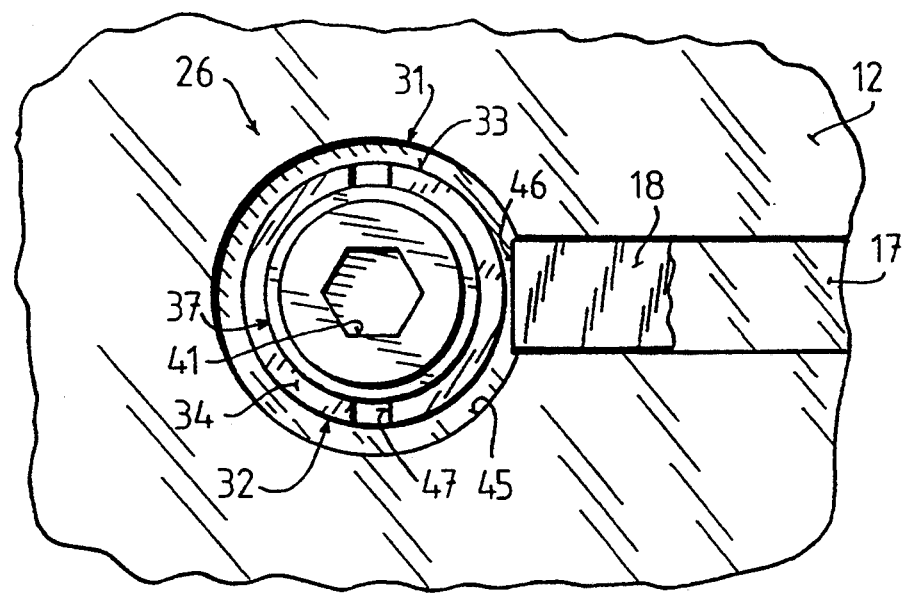
FIG. 3 is a plan view of region 2 in the direction of the arrow 3 in FIG. 1.

More precise details are illustrated in FIGS. 2 and 3, in which the axial adjuster 26 is taken as an example. At the outlet of the guide slot 17 a stepped bore 31 is formed in the main body 12 and contains a metallic stop pin 32. This stop pin 32 is in the form of a hollow cylinder having a smooth cylindrical outer surface 33 and an internal peripheral conical surface 35 leading out onto the end face 34 at the head end. An internal screw thread 36, which expediently continues to the bottom end, adjoins this first region of the inner wall.

The threaded stem 38 of a countersunk head screw 37 is screwed into the internal screw thread and the conical flank of the countersunk head 39 is thereby pressed against the internal peripheral conical surface 35. A polygonal hole 41 is formed in the end face of the countersunk head 39, and in it a correspondingly shaped operating tool can engage.

The bottom pin foot 42, which extends approximately halfway along the total length, is fastened by a force fit in the narrow first region 43 of the stepped bore 31.

The pin head 44 projecting beyond the narrow region lies inside the wider second region 45 of the stepped bore 31, so that the left-hand flank 46 of the cutter 18 can lie against the outer surface 33. The pin head 44 is split like a fork, preferably symmetrically, by a transverse slot 47 parallel to the axis of the pin. The pin head 44 can thus expand radially when the countersunk head screw 37 is screwed in towards the foot 42 of the pin. As a result of this expansion, the cutter 18 lying against the pin head 44 is moved along the guide slot 17. The turning of the countersunk head screw 37 is converted into an axial movement of the countersunk head 39 (relative to the axis of the pin) with considerable stepping-down by the screw thread connection. This screw thread connection constitutes a first wedge mechanism. A second wedge mechanism is formed by the conical surfaces expanding the pin head 44, whereby the aforesaid axial movement is once again stepped down into a radial movement of the regions of the pin head 44. Very accurate and sensitive longitudinal adjustment of the cutter 18 is thus possible.

The width of the second region 45 of the stepped bore is made such that the outer surface 33 of the pin head 44 lies against the wall of the bore when the expansion reaches the elastic limit. Further expansion is thereby prevented. The pin head 44 thus springs back to its initial state when the countersunk head screw 37 is turned back.

The transverse slot 47 expediently has in its inner end region a widening 38 after the style of a transverse bore, the maximum radial width of which reaches approximately 40 to 70% of the outside diameter of the stop pin 32. The main bending zone for the halves of the pin head 44 is thus shifted, after the style of a sheet joint, to a point at the greatest possible distance from the end face 32. The weakening of the pin head 44 should be so adjusted that the spring force by which the countersunk head 39 is clamped gives rise to sufficient frictional resistance to prevent unintentional loosening of the countersunk head screw 37. For this purpose, a viscous tincture having a locking action may also be applied to the threaded stem 38.

The stop pin 32 is preferably made of spring steel whose 0.2% proof stress should be approximately 1600 newtons per square millimeter. The stop pin 32 has, for example, a diameter of 4 mm with a total length of 10 mm. The widening 48 has a diameter of 2 mm and its center lies, both axially and radially, approximately in the middle of the stop pin 32. The narrow region of the transverse slot 47 has a width of 0.5 mm. The countersunk head screw 37 has a total length of 4 mm, while the countersunk head takes up approximately half the length, with a maximum diameter of 3 mm and a screw thread diameter of 2 mm. It is obvious that one or the other of the above dimensions may vary by, for example, ±30%.

Figure 4:
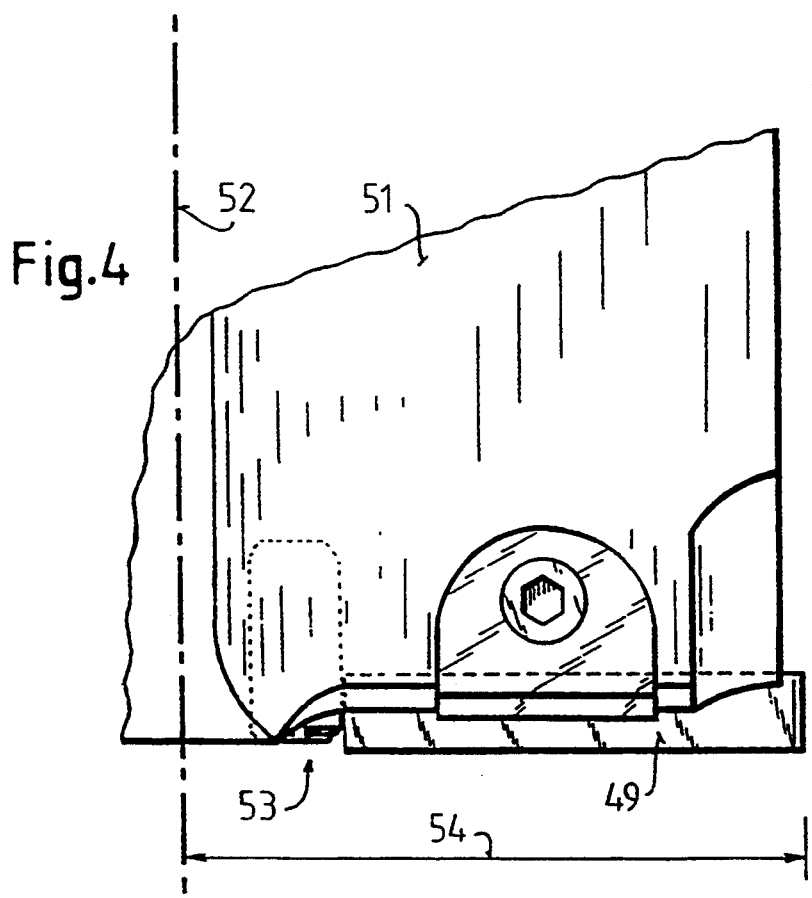
FIG. 4 is a partial side view of the front region of a plane face reamer according to the invention.

In the preferred embodiment, according to FIG. 1, the long cutting edges of the cutters 18 and 21 are aligned parallel to the axis of the drill (longitudinal axis 11), which corresponds to the standard type of machine reamer used principally for machining cylindrical bore surfaces. The short radial cutting edges 22 and 25 machine any narrow ledge-like steps. If, on the other hand, broad steps need to be machined, it is possible (as illustrated in FIG. 4) to arrange a cutter 49 on the end face of a drill main body 51 in such a manner that the long cutting edge is aligned perpendicular to the drill axis 52. The clamping of the cutter 49 and, in particular, its radial adjustment 53 for adjusting the drill radius 54 are in principle of the same configuration as in the preceding embodiment.

All embodiments have the common feature that the countersunk head screw is freely accessible from the outside of the main body on the cutter side, with the cutter inserted. The stepped bore may be in the form of a blind bore that only slightly weakens the main body and which need only be so deep that the countersunk head 39 or the end face 34 of the stop pin 32 does not project beyond the outer cutting edge of the cutter.

We claim:

1. Machine reamer comprising
   a main body with a blind bore and a guide slot with an end region,
   a cutter arranged to be guided longitudinally in said guide slot,
   a metallic stop pin having a head arranged to project into said end region of said guide slot to bear against said cutter to position said cutter in said guide slot,
   clamping means for clamping fast said cutter in said guide slot, and
   wedge means for expanding said head of said stop pin radially with fine adjustment to position said cutter in said guide slot with fine adjustment.

2. Machine reamer according to claim 1, wherein said stop pin comprises.
   an end face on said head
   an inner wall with a first region having an internal peripheral conical surface leading out to said end face and a second region having an internal screw thread directed towards a foot of said stop pin, and
   an axially parallel transverse slot splitting said head,
   wherein said wedge means comprises a screw having
      a threaded stem arranged to be screwed into said internal screw thread of said stop pin and a countersunk head arranged to be pressed against said internal peripheral conical surface of said stop pin.

3. Machine reamer according to claim 2, wherein said stop pin has a total length and said transverse slot has an axial length that is approximately 50 to 65% of said total length of said stop pin.

4. Machine reamer according to claim 3, wherein said stop pin has an outside diameter and said transverse slot on said stop pin has an inner end region with a widening transverse bore with a maximum radial width that is approximately 40 to 70% of said outside diameter.

5. Machine reamer according to claim 2, wherein said stop pin has a total length and a cylindrical outer surface having an outside diameter that is approximately 35 to 50% of said total length of said stop pin.

6. Machine reamer according to claim 2, wherein said blind bore of said main body comprises a stepped bore with a narrow first region in which said foot of said stop pin is fixed and a wider second region in which said head of said stop pin is positioned, said second region having a width that prevents expansion of said head beyond its elastic limit.

* * * * *